United States Patent
Taeshima (10) Patent No.: US 8,145,886 B2
(45) Date of Patent: Mar. 27, 2012

(54) CHANGING PROCESSOR FUNCTIONS BY CHANGING FUNCTION INFORMATION

(75) Inventor: Shinjiro Taeshima, Tokyo (JP)

(73) Assignee: NEC Corporation, Tokyo (JP)

( * ) Notice: Subject to any disclaimer, the term of this patent is extended or adjusted under 35 U.S.C. 154(b) by 550 days.

(21) Appl. No.: 11/776,602

(22) Filed: Jul. 12, 2007

(65) Prior Publication Data

US 2008/0016328 A1 Jan. 17, 2008

(30) Foreign Application Priority Data

Jul. 12, 2006 (JP) .................................. 2006-191233

(51) Int. Cl.
*G06F 9/30* (2006.01)

(52) U.S. Cl. ....................................................... 712/226

(58) Field of Classification Search ......................... None
See application file for complete search history.

(56) References Cited

U.S. PATENT DOCUMENTS

| 6,560,703 B1* | 5/2003 | Goodman ........................... 713/2 |
| 2002/0092008 A1* | 7/2002 | Kehne et al. ...................... 717/168 |
| 2004/0230878 A1* | 11/2004 | Mantey et al. ...................... 714/53 |
| 2005/0149713 A1* | 7/2005 | Rothman et al. ..................... 713/1 |
| 2006/0005046 A1* | 1/2006 | Hars .............................. 713/191 |
| 2006/0087885 A1* | 4/2006 | Murakami et al. ........ 365/185.17 |
| 2006/0101250 A1* | 5/2006 | Rapp et al. ..................... 712/226 |

FOREIGN PATENT DOCUMENTS

| JP | 60252977 | 12/1985 |
| JP | 04-329462 | 11/1992 |
| JP | 08-272757 | 10/1996 |
| JP | 09-319690 | 12/1997 |
| JP | 2003-162514 | 6/2003 |

OTHER PUBLICATIONS

Japanese Official Action—2006-191233—Oct. 20, 2011.

* cited by examiner

*Primary Examiner* — Robert Fennema (74) *Attorney, Agent, or Firm* — Young & Thompson (57) ABSTRACT

An information processing equipment comprises: a processor configured to refer to a function information indicating an assigned function and to execute a firmware code corresponding to the function information; and a memory in which the firmware code and the function information are stored. The information processing equipment further comprises a function change module configured to rewrite the function information.

14 Claims, 11 Drawing Sheets

CHANGING PROCESSOR FUNCTIONS BY CHANGING FUNCTION INFORMATION

INCORPORATION BY REFERENCE

This application is based upon and claims the benefit of priority from Japanese patent application No. 2006-191233, filed on Jul. 12, 2006, the disclosure of which is incorporated herein in its entirely by reference.

BACKGROUND OF THE INVENTION

1. Field of the Invention

The present invention at least relates to an information processing equipment. The present invention particularly relates to an information processing equipment that includes a plurality of processors.

2. Description of Related Art

An information processing equipment such as a mainframe, a server and the like is required to perform complex processing in large amounts with high speed. For this reason, the information processing equipment is provided with dedicated processors for every function and the dedicated processors perform respective processing (For example, see Japanese Laid-Open Patent Application JP-A-Heisei. 3-63869, Japanese Laid-Open Patent Application JP-P2003-162514). The dedicated processors are exemplified by an input-output processor that controls input and output with respect to a peripheral device, an encryption processor that dedicatedly performs data encryption and decryption, a TCP/IP offload engine that dedicatedly deals with TCP/IP protocol, and the like. Such the dedicated processors are LSIs and fixedly installed in the information processing equipment.

Such the information processing equipment has the following problems. That is, when load on a certain dedicated processor is increased and hence processing power of the dedicated processor becomes insufficient, the entire performance of the information processing equipment is reduced. Also, if an only one dedicated processor installed in the information processing equipment fails, the entire information processing equipment halts. Moreover, the dedicated processor is an expensive LSI and bug fix and function addition are not easy. Therefore, a technique is desired which can freely switch the function of each processor during operations of the information processing equipment.

Japanese Laid Open Patent Application JP-A-Showa 60-252977 (hereinafter referred to as a patent document) discloses a multiprocessor system that has a plurality of processor means with different architectures. Each of the processor means has an input-output processor function in addition to its primary processor function. The each processor means is so configured as to perform the input-output processor function during its idle state in accordance with an instruction from a bus-dominance control means.

According to the technique disclosed in the patent document, the processor means having its primary processor function can be switched during the idle state to perform the input-output processor function. However, for example, the processor means can not perform a new function which the processor means does not originally have (in the case of the patent document, the new function is a function other than the primary processor function and the input-output processor function). There may be a case where a processor function needs to be switched to a function that the processor does not originally have, while the processor function can not freely be switched depending on the situation. For example, if an only one dedicated processor installed in the information processing equipment fails and the function of that one dedicated processor is a function which the other processors do not originally have, the operations of the entire information processing equipment stop.

SUMMARY OF THE INVENTION

In an exemplary aspect of the invention, an information processing equipment includes a processor, a memory and a function change module. A function information indicating a function assigned to the processor and a firmware code are stored in the memory. The processor refers to the function information and executes a firmware code corresponding to the function information. The function change module can rewrite the function information.

As described above, the rewritable function information is provided in the memory. Each processor refers to a related function information and executes a firmware code which provides a function specified by the related function information. Therefore, a function provided by a certain processor can be freely switched by rewriting the function information related to the certain processor. In other words, it is possible to switch a function of a certain processor to another function which the certain processor does not originally have.

According to the exemplary aspect of the invention, for example, it is possible to switch a function of a processor to another function that the processor does not originally have.

EXEMPLARY EMBODIMENTS

An information processing equipment according to exemplary embodiments of the present invention will be described below with reference to the attached drawings. The information processing equipment according to the exemplary embodiments is a multiprocessor system that includes a plurality of processors.

1. General Configuration

Figure 1:
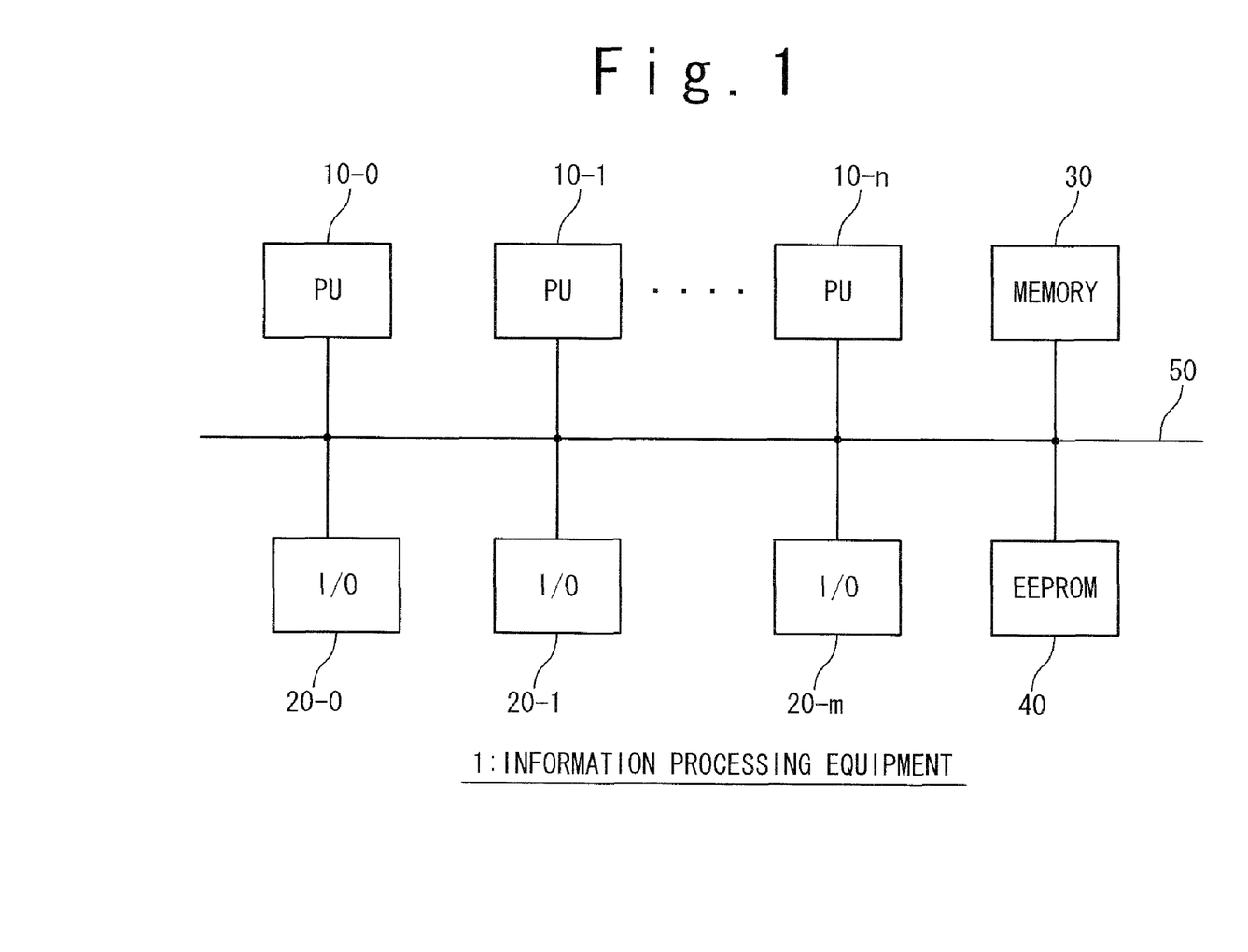
FIG. 1 is a block diagram showing a configuration of an information processing equipment according to an exemplary embodiment of the present invention.

FIG. 1 is a block diagram showing a configuration of an information processing equipment 1 according to an exemplary embodiment of the present invention. The information processing equipment 1 is provided with processors 10-0 to 10-$n$ (n is a natural number), I/O (Input-Output) devices 20-0 to 20-$m$ (m is a natural number), a memory 30 and a memory 40. The memory 40 is a rewritable nonvolatile memory such as a flash memory, an EEPROM (Electrically Erasable Programmable ROM) or the like. In the present specification, the memory 40 is exemplified by an EEPROM. The processors 10-0 to 10-$n$, the I/O devices 20-0 to 20-$m$, the memory 30 and the EEPROM 40 are connected with each other through a bus 50 and inter-access is possible therebetween.

Each of the processors 10 is a general-purpose processor. Each processor 10 may have a cache memory and a local memory inside. Each processor 10 executes codes stored in the memory 30 and the EEPROM 40 to perform given processing. The codes include a firmware code in addition to an OS (Operating System) and an application software code. The firmware code is referred to as an "FW code" hereinafter. Also, each of the processors 10 has an inter-processor communication function for establishing communication with another processor. The inter-processor communication is performed with the use of interrupt and a part of the area of the memory 30, for example. The inter-processor communication may be performed by other methods.

Each of the I/O devices 20 is an input-output device that controls data transfer between external peripheral devices and the memory 30 in accordance with an instruction from the processor 10. Also, each I/O device 20 has a function of reporting information on the control to a specified processor 10. The specified processor 10 that receives the report is indicated by a predetermined register which the I/O device 20 has, for example.

2. Memory Configuration

Figure 2:
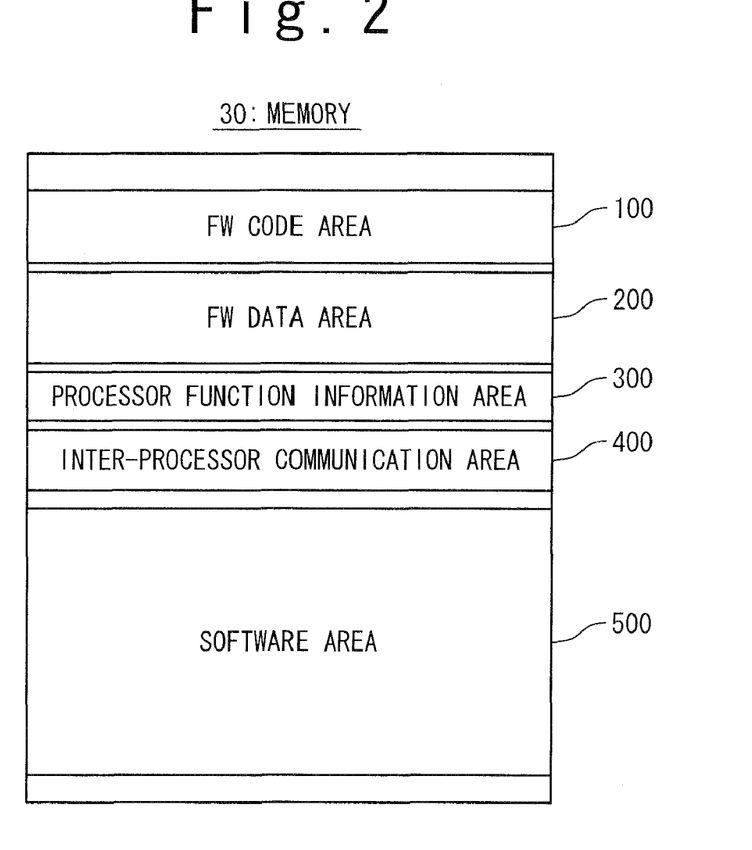
FIG. 2 is a conceptual diagram showing a configuration of a memory according to the exemplary embodiment.

FIG. 2 conceptually shows an example of a configuration of the memory 30 according to the exemplary embodiment. The memory 30 according to the exemplary embodiment includes an FW code area 100, an FW data area 200, a processor function information area 300, an inter-processor communication area 400 and a software area 500. Codes and data of the OS and the application software are stored in the software area 500.

Figure 3:
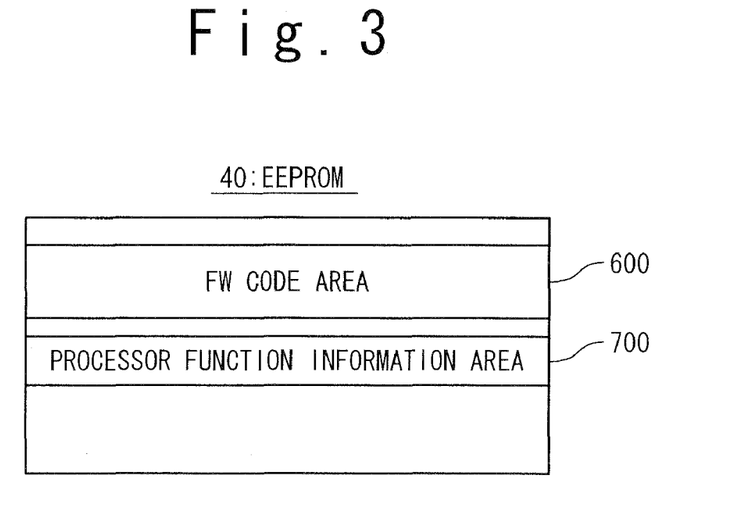
FIG. 3 is a conceptual diagram showing a configuration of an EEPROM according to the exemplary embodiment.

FIG. 3 conceptually shows an example of a configuration of the EEPROM 40 according to the exemplary embodiment. The EEPROM 40 according to the exemplary embodiment has an FW code area 600 and a processor function information area 700.

2-1. FW Code Areas 100 and 600

Figure 4:
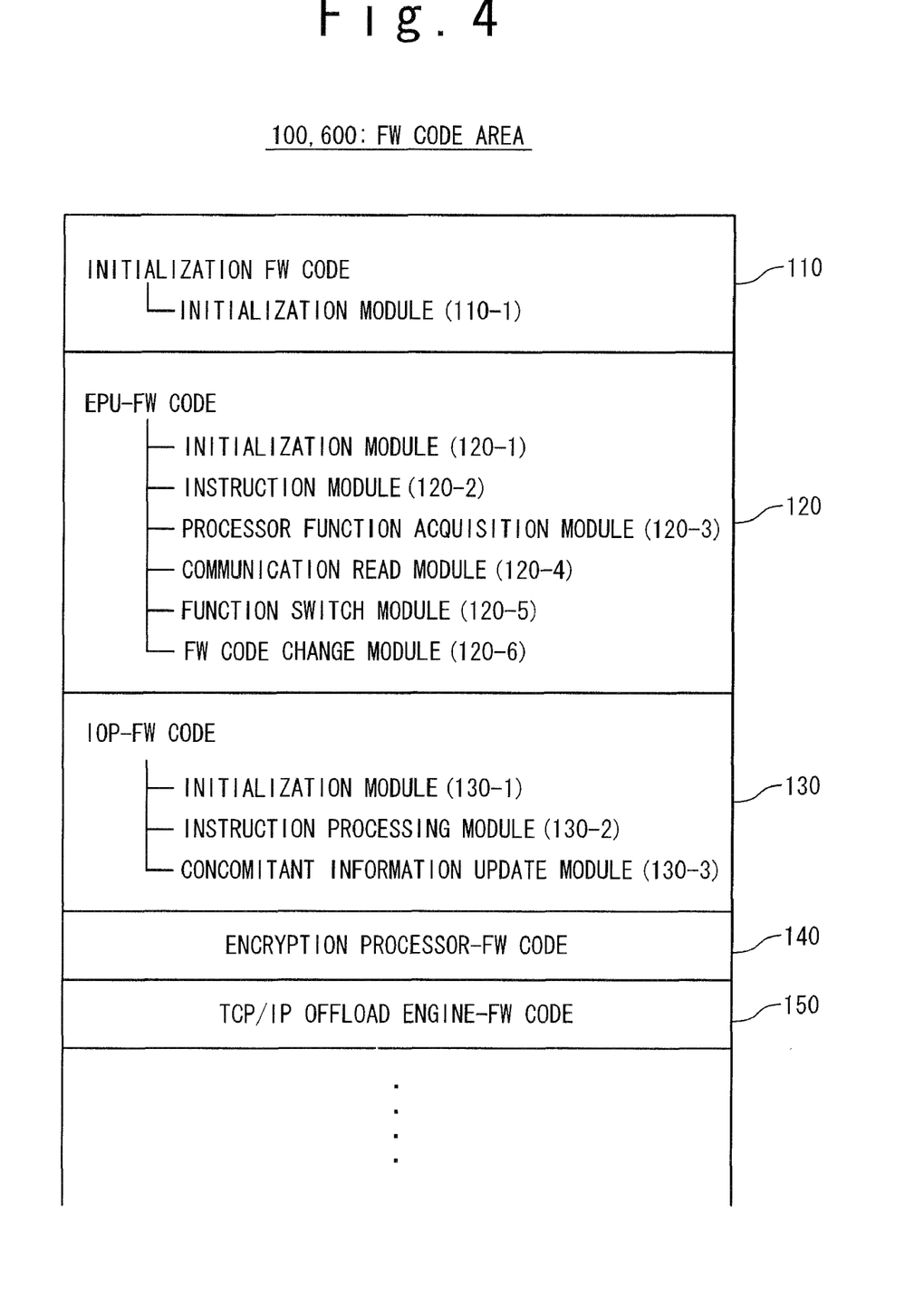
FIG. 4 is a conceptual diagram showing contents of an FW code area according to the exemplary embodiment.

Stored in the FW code areas 100 and 600 are various "FW codes" for providing the processors 10 with various functions. The FW codes stored in the FW code area 600 of the EEPROM 40 are executed at startup of the information processing equipment 1 and copied to the FW code area 100 of the memory 30. FIG. 4 shows one example of the various FW codes stored in the FW code areas 100 and 600. As shown in FIG. 4, an initialization FW code 110, an EPU-FW code 120, an IOP-FW code 130, an encryption processor-FW code 140, a TCP/IP (Transmission Control Protocol/Internet Protocol) offload engine-FW code 150 and so on are stored at given addresses of the FW code areas 100 and 600, respectively.

The TCP/IP offload engine provides a function of off-loading TCP/IP protocol processing by hardware.

The initialization FW code 110 is an FW code that performs initial settings at the startup of the information processing equipment 1. The initialization FW code 110 includes an initialization module 110-1. The initialization module 110-1 refers to function information (described later) stored in the processor function information area 300 and initializes the processors 10-0 to 10-$n$ to make them have respective functions specified by the function information.

The EPU-FW code 120 makes a processor 10 function as an "EPU (Execution Processing Unit)". The EPU is a processor that executes the codes of the OS and the application software. That is to say, the processor 10 (EPU) executing the EPU-FW code 120 executes the codes of the OS and the application software and issues specific instructions to the information processing equipment 1. The EPU-FW code 120 serves as an interface between the OS/application software and the information processing equipment 1.

The EPU-FW code 120 includes an initialization module 120-1, an instruction module 120-2, a processor function acquisition module 120-3, a communication read module 120-4, a function switch module 120-5 and an FW code change module 120-6. The initialization module 120-1 initializes the processor 10 as the EPU. In response to instructions from the OS or the application software, the instruction module 120-2 issues an instruction to a certain processor 10 which carries out the instructed processing. The processor function acquisition module 120-3 refers to the processor function information area 300 (described later) and reads out function information assigned to the respective processors 10. The communication read module 120-4 refers to the inter-processor communication area 400 (described later) and reads out information on the inter-processor communication. The function switch module 120-5 switches a function of a specified processor 10. The FW code change module 120-6 changes the FW codes stored in the FW code area 600 of the EEPROM 40.

The IOP-FW code 130 makes a processor 10 function as an "IOP (Input-Output Processor)". The IOP controls the data input-output with respect to peripheral devices in accordance with an instruction from the EPU. That is to say, the processor 10 (IOP) executing the IOP-FW code 130 does not execute the codes of the OS and the application software but provides only a dedicated function of the data input-output.

The IOP-FW code 130 includes an initialization module 130-1, an instruction processing module 130-2 and a concomitant information update module 130-3. The initialization module 130-1 initializes the processor 10 as a dedicated function processor, namely, the IOP. The instruction processing module 130-2 performs processing instructed by the EPU, namely, the data input-output processing. The concomitant information update module 130-3, when concomitant information in the processor function information area 300 (described later) is updated, reads out the concomitant information and reflects it in the processor 10.

The encryption processor-FW code 140 makes a processor 10 function as an encryption processor that dedicatedly performs data encryption and decryption. The TCP/IP offload engine-FW code 150 makes a processor 10 function as a TCP/IP offload engine. The TCP/IP offload engine off-loads TCP/IP protocol processing by hardware. The FW codes other than the initialization FW code 110 and the EPU-FW code 120 are "dedicated function FW codes" for providing the processor 10 with the dedicated functions. A processor 10 (dedicated function processor) executing the dedicated function FW code does not execute the codes of the OS and the application software but executes only the dedicated function FW code. Each of the dedicated function FW codes 140 and 150 includes the initialization module, the instruction processing module and the concomitant information update module, as in the case of the IOP-FW code 130.

It should be noted that one FW code having a plurality of processing functions instead of the plurality kinds of FW codes may be stored in the FW code areas 100 and 600.

2-2. FW Data Area 200

Figure 5:
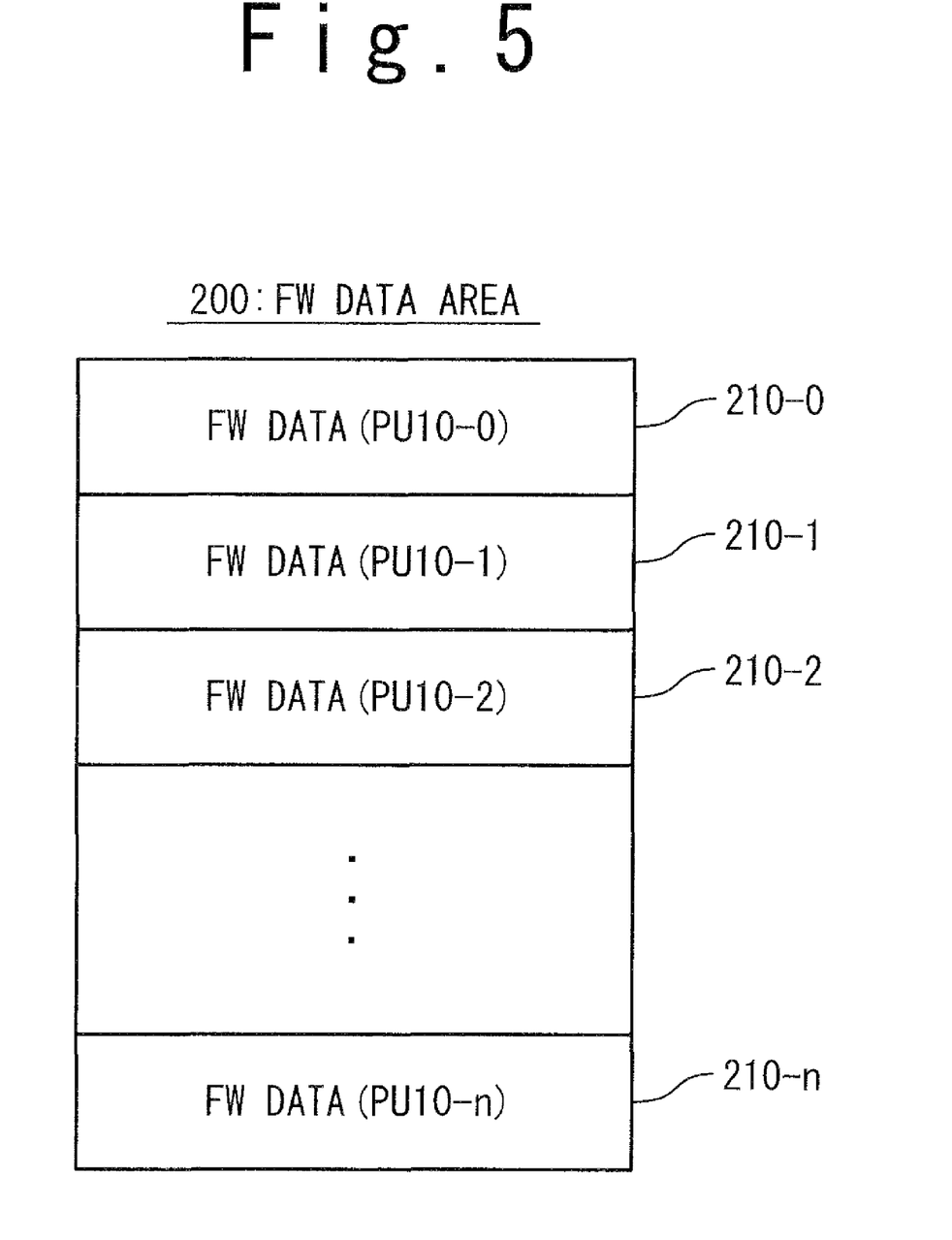
FIG. 5 is a conceptual diagram showing contents of an FW data area according to the exemplary embodiment.

Stored in the FW data area 200 are data (referred to as "FW data 210" hereinafter) that are necessary for the processors 10-0 to 10-$n$ to achieve the various functions by executing the respective FW codes. FIG. 5 conceptually shows one example of the FW data area 200. As shown in FIG. 5, the FW data area 200 is divided into a plurality of areas, and the FW data 210-0 to 210-$n$ associated with the respective processors 10-0 to 10-$n$ are stored in the plurality of areas, respectively. For instance, the FW data 210-0 is data that the processor 10-0 needs when executing a certain FW code. Contents of each FW data 210 depend on a kind of the FW code executed by the corresponding processor 10. Also, addresses at which the FW data 210 related to the respective processors 10 are stored are predetermined and fixed.

2-3. Processor Function Information Areas 300 and 700

Figure 6:
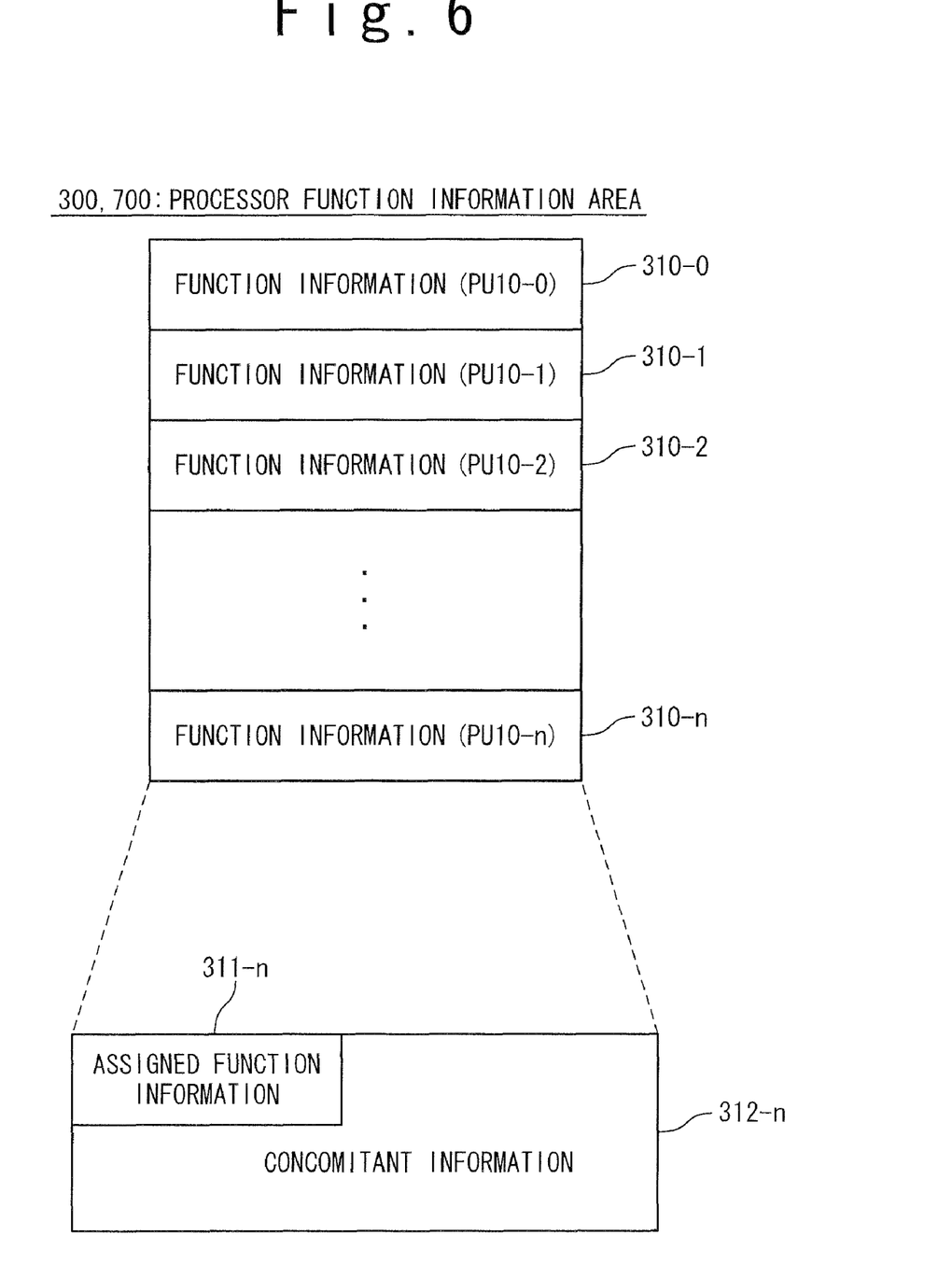
FIG. 6 is a conceptual diagram showing contents of a processor function information area according to the exemplary embodiment.

Stored in the processor function information areas 300 and 700 are information (referred to as "function information 310" hereinafter) regarding functions which the respective processors 10-0 to 10-$n$ provide. That is, the function information 310 indicate functions assigned to the respective processors 10-0 to 10-$n$. FIG. 6 conceptually shows one example of the processor function information areas 300 and 700. As shown in FIG. 6, the processor function information areas 300 and 700 are divided into a plurality of areas, and the function information 310-0 to 310-$n$ associated with the respective processors 10-0 to 10-$n$ are stored in the plurality of areas, respectively. For example, the function information 310-0 specifies a function that the processor 10-0 provides by executing an FW code. Addresses at which the function information 310 related to the respective processors 10 are stored are predetermined and fixed.

Also, each of the function information 310 includes assigned function information 311 and concomitant information 312. The assigned function information 311 indicates a function itself, such as EPU, IOP and the like, that is assigned to the corresponding processor 10. On the other hand, the concomitant information 312 indicates a configuration and the like associated with the assigned function and is specific to every function. In a case where the assigned function information 311 specifies the IOP, for example, the concomitant information 312 associated with the assigned function information 311 specifies the I/O device 20 controlled by the IOP.

It should be noted that a set of the function information 310 stored in the processor function information area 700 of the EEPROM 40 indicates a function configuration of the processors 10-0 to 10-$n$ at the startup of the information processing equipment 1. At the startup of the information processing equipment 1, the set of function information 310 is copied to the processor function information area 300 of the memory 30. Each of the processors 10-0 to 10-$n$ executes a corresponding FW code based on the function information 310 and thereby provides a given function.

The FW codes and the function information 310 stored in the EEPROM 40 as mentioned above play an important role in determining the function and configuration of the information processing equipment 1. It is therefore preferable that the memory 40 is a rewritable memory such as the EEPROM, a flash memory and the like. In this case, the data stored in the memory 40 can be changed (updated) by the OS, the application software, or a maintenance terminal connected to the information processing equipment 1.

2-4. Inter-Processor Communication Area 400

Figure 7:
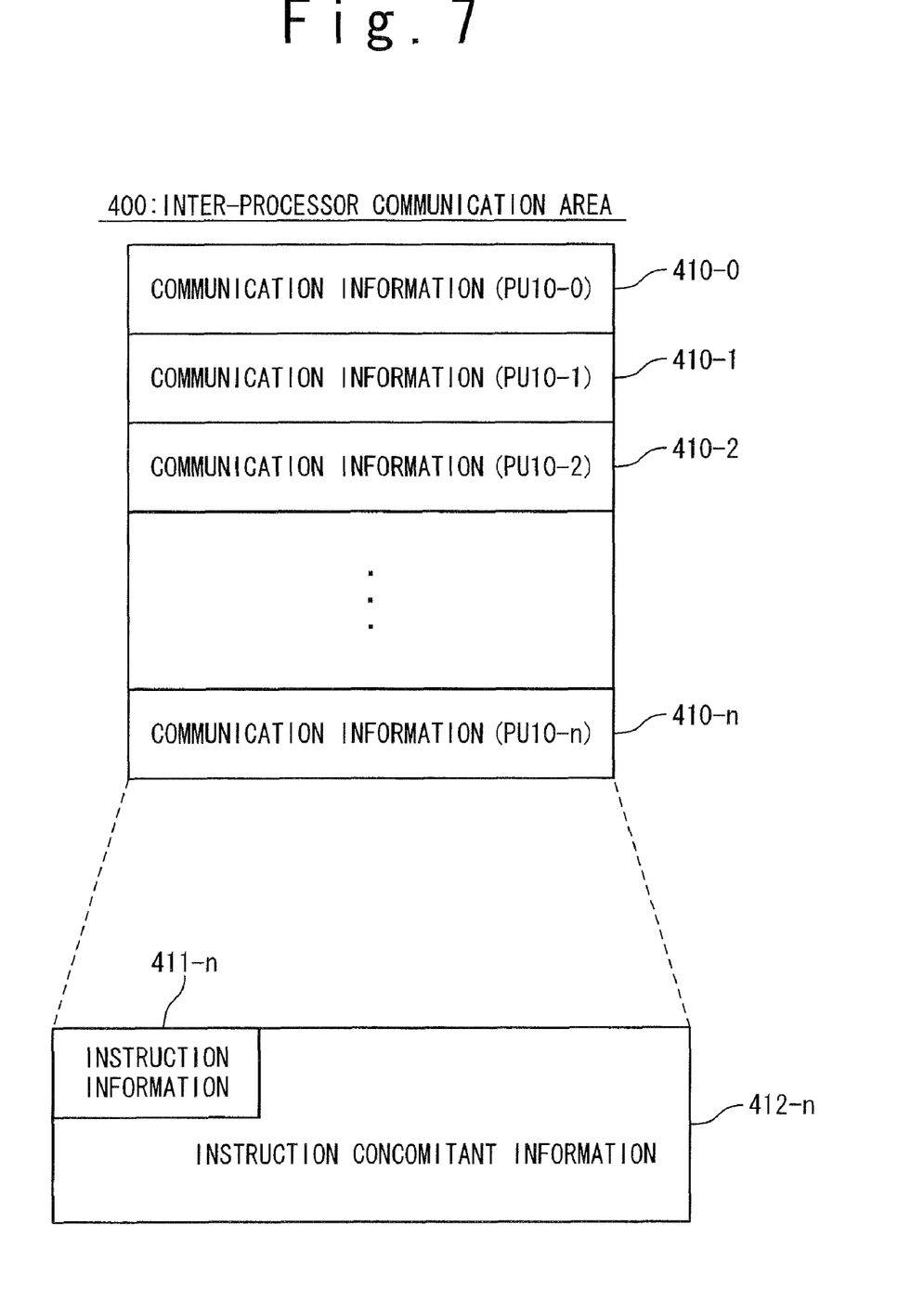
FIG. 7 is a conceptual diagram showing contents of an inter-processor communication area according to the exemplary embodiment.

Stored in the inter-processor communication area 400 are information (referred to as "communication information" hereinafter) used in the inter-processor communication. FIG. 7 conceptually shows one example of the inter-processor communication area 400. As shown in FIG. 7, the inter-processor communication area 400 is divided into a plurality of areas, and the communication information 410-0 to 410-$n$ related to the respective processors 10-0 to 10-$n$ are stored in the plurality of areas, respectively. For instance, the communication information 410-0 is information necessary for the inter-processor communication relevant to the processor 10-0. Addresses at which the communication information 410 related to the respective processors 10 are stored are predetermined and fixed.

As shown in FIG. 7, each of the communication information 410 includes instruction information 411 and instruction concomitant information 412. The instruction information 411 indicates an instruction in the inter-processor communication. On the other hand, the instruction concomitant information 412 indicates information associated with the instruction. In a case of a processor 10 that is assigned to the IOP, for example, the instruction concomitant information 412 specifies the I/O device 20 which the IOP should deal with.

In the inter-processor communication, the communication information 410 is stored in an area that is related to a destination processor 10 and interrupt processing is performed. The destination processor 10 that has received the interrupt reads out the communication information 410 stored in the area related to the destination processor 10. Consequently, the destination processor 10 can receive the communication. An interrupt signal used in the inter-processor communication is fixed, and each processor 10 can recognize the inter-processor communication based on the interrupt signal.

Additionally, a unique identification number is given to each of the processors 10-0 to 10-$n$. By reading the identification number, an FW code can recognize the processor 10 that is executing the FW code itself. As a result, the FW code can obtain an address in the FW data area 200 related to the recognized processor 10 and use the FW data 210 stored in the address. Also, the FW code can obtain an address in the processor function information area 300 related to the recognized processor 10 and use the function information 310 stored in the address. Moreover, the FW code can obtain an address in the inter-processor communication area 400 related to the recognized processor 10 and use the communication information 410 stored in the address.

The FW code area 100, the FW data area 200, the processor function information area 300 and the inter-processor communication area 400 mentioned above do not necessarily need to be provided on the memory 30. These areas 100 to 400 just need to be provided so as to be accessible by the processors 10-0 to 10-$n$. Moreover, the FW codes and the function information 310 mentioned above do not necessarily need to be stored in the EEPROM 40. The FW codes and the function information 310 just need to be stored in an area which the processors 10-0 to 10-$n$ can access at the startup of the information processing equipment 1.

3. Operation

Next, operations of the information processing equipment 1 according to the exemplary embodiment will be described in detail with reference to the foregoing drawings and FIG. 8. In the description below, the FW code area 100, the FW data area 200, the processor function information area 300 and the inter-processor communication mentioned above area 400 are provided on the memory 30. Those areas 100 to 400 are positioned to fixed addresses on the memory 30 and the FW code can recognize the addresses. The FW codes and the function information 310 used at the time of the startup are stored in the EEPROM 40.

3-1. Operation at Startup

Figure 9:
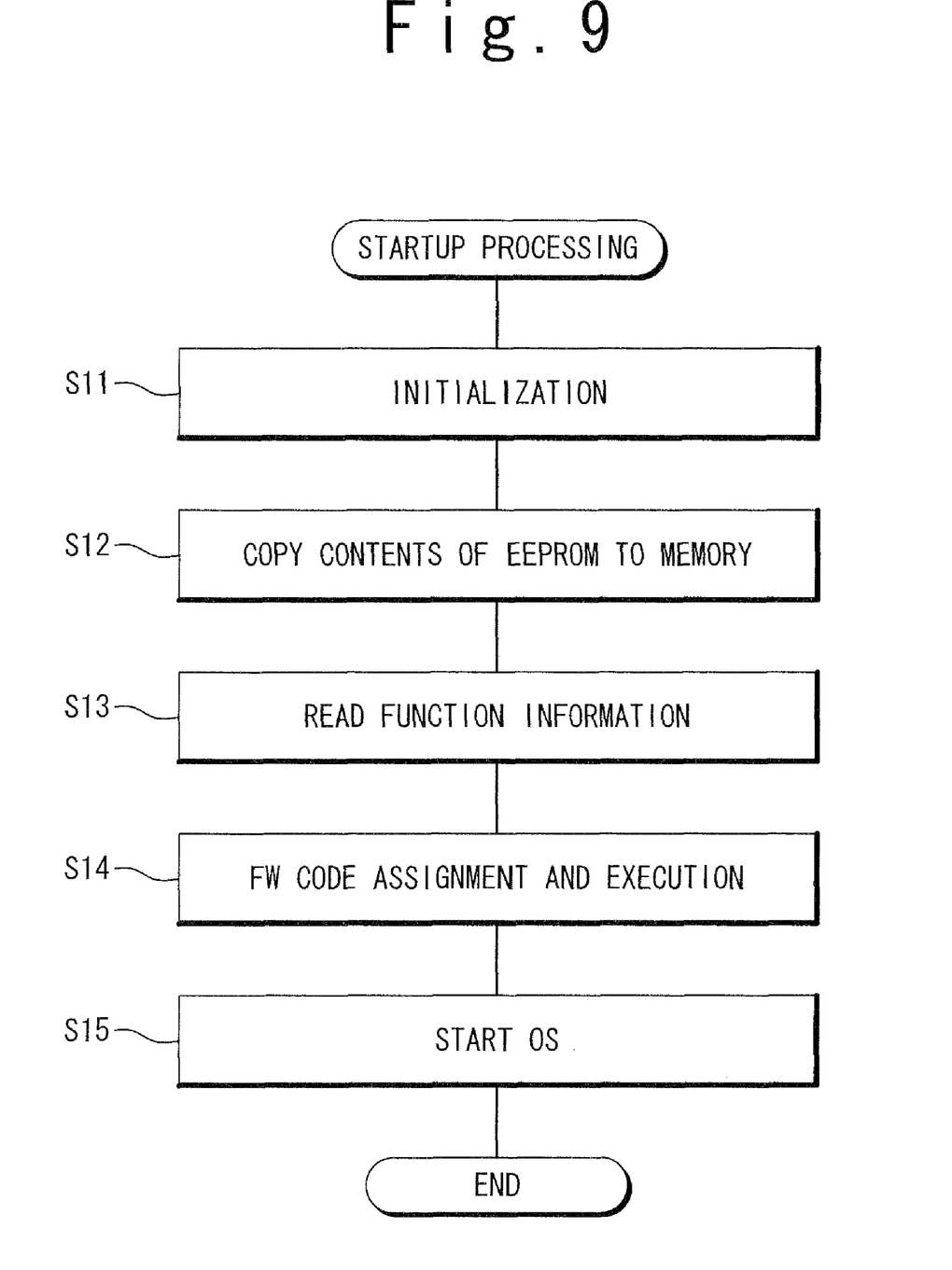
FIG. 9 is a flow chart showing an operation at startup of the information processing equipment according to the exemplary embodiment.

FIG. 9 is a flow chart showing an operation of the information processing equipment 1 at the time of the startup. The operation of the information processing equipment 1 at the startup is as follows.

Step S11:

First, all the processors 10-0 to 10-$n$ access the FW code area 600 of the EEPROM 40 and execute the initialization module 110-1 of the initialization FW code 110. Mediation is then conducted among the all processors 10-0 to 10-$n$ and a single processor 10 that performs initialization of the information processing equipment 1 is determined. The single processor that performs the initialization is hereinafter referred to as an "initialization processor 10-$a$". The processors 10 other than the initialization processor 10-$a$ become in idle state (IDLE) during executing the initialization module 110-1 and wait for an instruction from the initialization processor 10-$a$.

Step S12:

Next, the initialization processor 10-$a$ clears contents of the memory 30. Subsequently, the initialization processor 10-$a$ reads out the FW codes 110 to 150 and the function information 310-0 to 310-$n$ from the FW code area 600 and the processor function information area 700 of the EEPROM 40, respectively. Then, the initialization processor 10-$a$ stores the read information in the FW code area 100 and the processor function information area 300 of the memory 30, respectively. That is to say, the contents of the EEPROM 40 are copied to the memory 30.

Step S13:

Next, the initialization processor 10-$a$ reads out the function information 310-0 to 310-$n$ corresponding to the respective processors 10-0 to 10-$n$ from the processor function information area 300 of the memory 30 in order. The read-out function information 310-0 to 310-$n$ include the assigned function information 311-0 to 311-$n$, respectively.

Step S14:

Based on the assigned function information 311-0 to 311-$n$, the initialization processor 10-$a$ instructs the respective processors 10-0 to 10-$n$ to perform initialization. More specifically, the initialization processor 10-$a$ instructs them to execute the initialization module of the FW code corresponding to the assigned function. The instruction to a target processor 10-$i$ (i: 0 to n) is given by using the inter-processor communication area 400. The initialization processor 10-$a$ stores the communication information 410-$i$ (instruction information 411-$i$, instruction concomitant information 412-$i$) in an area of the inter-processor communication area 400 related to the target processor 10-$i$. Here, the instruction information 411-$i$ instructs to execute the initialization module of the FW code corresponding to the assigned function. Then, the initialization processor 10-$a$ reports "interrupt" to the target processor 10-$i$.

The target processor 10-$i$ that has been in the idle state receives the interrupt. In response to the interrupt, the target processor 10-$i$ accesses the relevant area in the inter-processor communication area 400 and reads out the stored communication information 410-$i$. The target processor 10-$i$ then performs processing in accordance with the instruction information 411-$i$ and the instruction concomitant information 412-$i$. More specifically, the target processor 10-$i$ executes the initialization module of the FW code corresponding to the specified function.

For example, in a case where a processor 10-$b$ is assigned to an IOP, the processor 10-$b$ accesses the FW code area 100 in the memory 30 and executes the initialization module 130-1 of the IOP-FW code 130. As a result, the processor 10-$b$ is initialized to be the IOP. Furthermore, the processor 10-$b$ also performs "initial setting" of an I/O device 20-$b$ which the processor 10-$b$ deals with. The I/O device 20-$b$ is specified by the instruction concomitant information 412-$b$ in the communication information 410-$b$. Therefore, the processor 10-$b$ reads out the instruction concomitant information 412-$b$ and performs the initial setting of the specified I/O device 20-$b$. Specifically, the processor 10-$b$ conducts the initial setting so that interrupt from the I/O device 20-$b$ can be processed. After finishing the execution of the initialization module 130-1, the processor 10-$b$ becomes in the idle state again during executing the IOP-FW code 130 and waits for the next instruction.

Also, in a case where a processor 10-$c$ is assigned to an EPU, the processor 10-$c$ accesses the FW code area 100 in the memory 30 and executes the initialization module 120-1 of the EPU-FW code 120. As a result, the processor 10-$c$ is initialized to be the EPU. After finishing the execution of the initialization module 120-1, the processor 10-$c$ becomes in the idle state again during executing the EPU-FW code 120 and waits for the next instruction.

Step S15:

Next, the initialization processor 10-$a$ reads out an OS startup program from the I/O device 20-$a$ as a startup path, and loads the OS startup program into the memory 30. In general, the startup path is stored in the EEPROM 40. Then, the initialization processor 10-$a$ executes codes of the OS startup program. The started OS first issues an instruction to a processor 10 executing the EPU-FW code 120. In response to the instruction, the processor 10 executing the EPU-FW code 120 executes the processor function acquisition module 120-3. The processor function acquisition module 120-3 refers to the processor function information area 300 of the memory 30 and obtains the function information 310-0 to 310-$n$ assigned to the respective processors 10-0 to 10-$n$. The EPU-FW code 120 returns the function information 310-0 to 310-$n$ to the OS 5.

In this manner, the OS 5 obtains the function information 310-0 to 310-$n$ assigned to the respective processors 10-0 to 10-$n$. Subsequently, the OS 5 gives instructions to all the processors 10 to which the EPU is assigned, such that those processors 10 can operate as the EPUs. For instance, the OS 5 performs a specific interrupt processing with respect to the processor 10-$c$ to which the EPU is assigned. The OS 5 loads the interrupt processing into the memory 30 in advance before performing the interrupt, and then performs the interrupt with respect to the processor 10-$c$. Thus, the OS 5 can make the processor 10-$c$ shift to the interrupt processing and hence processing of the OS.

As a result of the above-described startup processing, the processors 10-0 to 10-$n$ can provide the respective functions corresponding the function information 310-0 to 310-$n$ stored in the processor function information area 300.

3-2. Operation After the Startup

Figure 10:
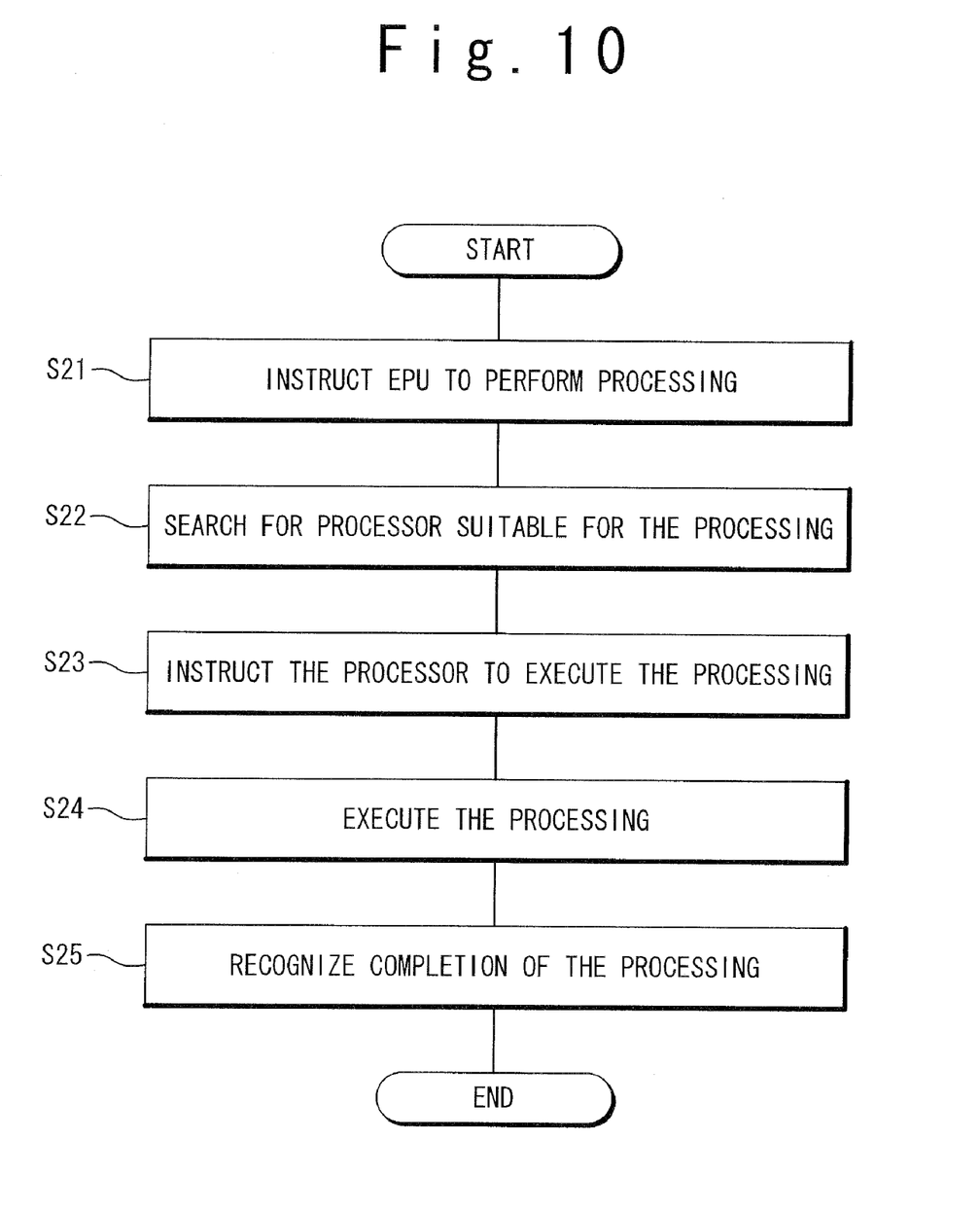
FIG. 10 is a flow chart showing an operation after startup of the information processing equipment according to the exemplary embodiment.

FIG. 10 is a flow chart showing an operation of the information processing equipment 1 after the startup. The operation of the information processing equipment 1 after the startup is as follows.

Figure 8:
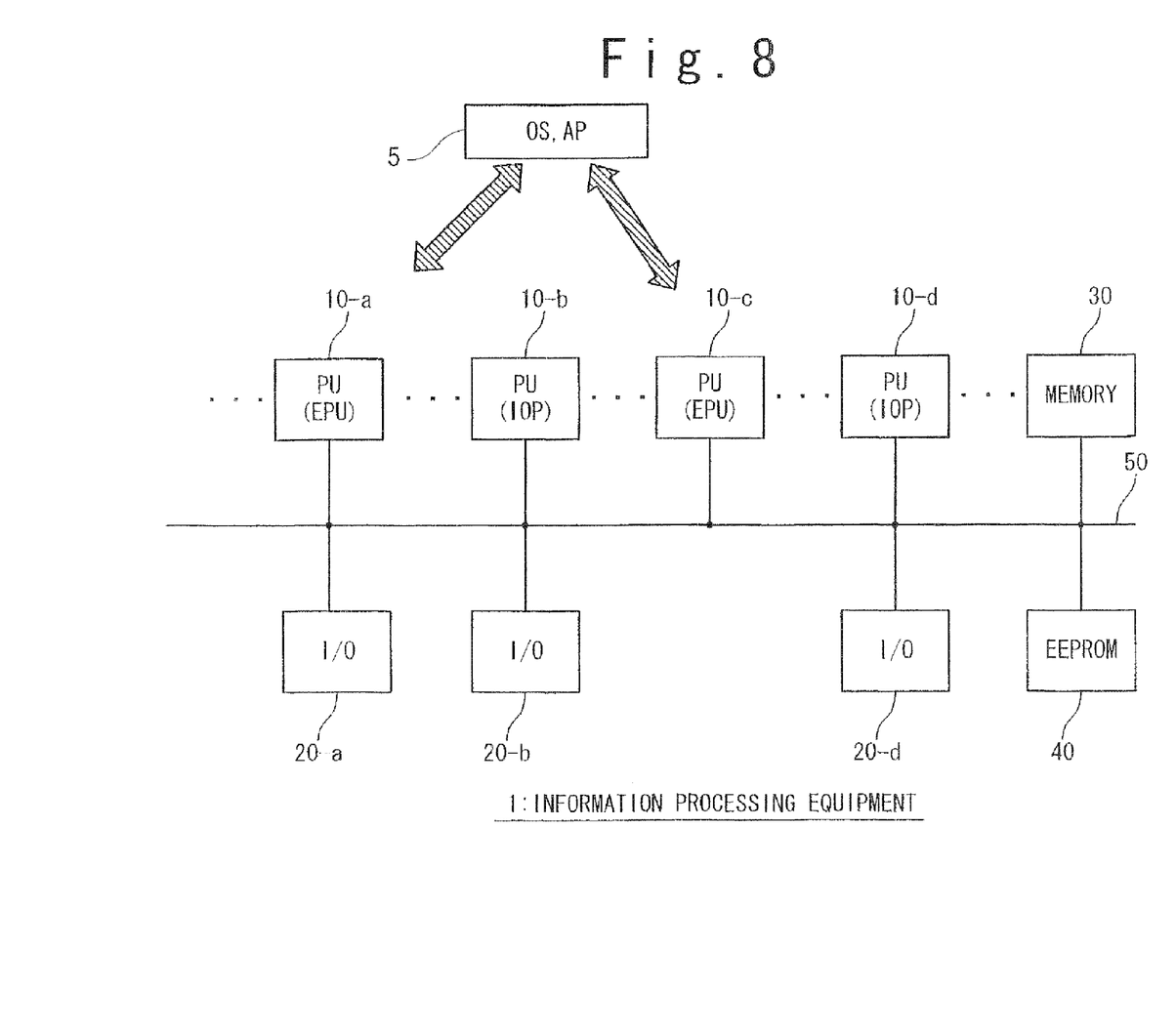
FIG. 8 is a diagram for explaining operations of the information processing equipment according to the exemplary embodiment.

Step S21:

Here, let us consider a case where the OS or the application software performs a specific processing that depends on the information processing equipment 1 shown in FIG. 8. For example, the OS or the application software (AP) performs an input-output processing with respect to the I/O device 20-*b*. In this case, the OS or the application software specifies the I/O device 20-*b* and instructs a processor 10 that is the EPU (e.g. the processor 10-*c*) to perform the input-output processing. In general, the instruction from the OS is given by storing an instruction code and a parameter in a specific register of the processor 10.

Step S22:

When receiving the instruction, the processor 10-*c* executes the instruction module 120-2 of the EPU-FW code 120. The instruction module 120-2 accesses the processor function information area 300 of the memory 30 and searches for a processor 10 suitable for carrying out the instruction. For instance, the instruction module 120-2 refers to the function information 310-*b* (assigned function information 311-*b*=IOP, concomitant information 312-*b*=I/O device 20-*b*) and finds the processor 10-*b* which deals with the I/O device 20-*b*.

Step S23:

The instruction module 120-2 instructs the processor 10-*b* to execute the input-output processing, based on the inter-processor communication. After that, control is returned from the EPU-FW code 120 to the OS, and the OS performs a waiting processing with regard to the instruction and also performs successive processing.

Step S24:

The processor 10-*b* which has received the instruction executes the instruction processing module 130-2 of the IOP-FW code 130. The instruction processing module 130-2 performs the input-output processing instructed by the instruction module 120-2. Here, if a memory area is necessary for the input-output processing, the instruction processing module 130-2 uses an area in the FW data area 200 related to the processor 10-*b*, and the FW data 210-*b* is stored in the area. After the input-output processing is completed, the instruction processing module 130-2 accesses the processor function information area 300 of the memory 30 and finds any processor 10 to which an EPU is assigned (e.g. processor 10-*c*). Then, based on the inter-processor communication, the instruction processing module 130-2 reports the completion of the input-output processing to the processor 10-*c*.

Step S25:

When the processor 10-*c* to which the EPU is assigned receives the report of the completion of the input-output processing, an interrupt processing of the OS starts. In the interrupt processing, the OS makes the processor 10-*c* execute the communication read module 120-4 of the EPU-FW code 120. The communication read module 120-4 refers to the communication information 410-*c* in the inter-processor communication area 400 and reads out information on the inter-processor communication. In this manner, the OS recognizes the completion of the input-output processing and resumes the associated processing. Information used in the inter-processor communication may be edited by the communication read module 120-4 and unified for the OS.

3-3. Function Switch Operation

Figure 11:
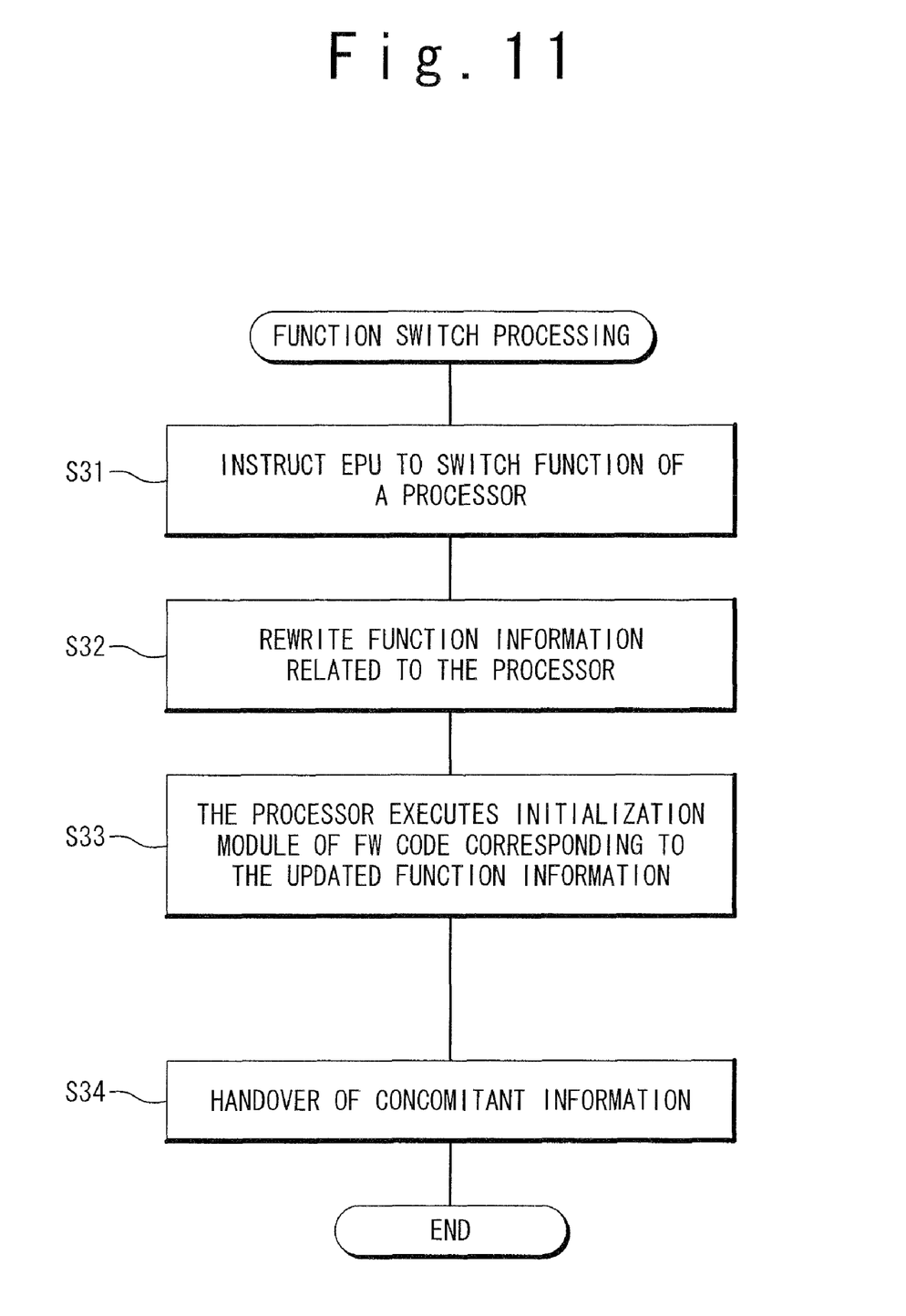
FIG. 11 is a flow chart showing an operation of switching a processor function in the information processing equipment according to the exemplary embodiment.

When load on a certain processor 10 is increased and hence processing power of the processor 10 becomes insufficient, the entire performance of the information processing equipment 1 is reduced. In such a case, it is desirable to switch a function of another processor 10 to the function of the heavy-loaded processor 10 in order to balance the load. FIG. 11 is a flow chart showing an operation of switching a function of a processor 10 in the information processing equipment 1. The operation of switching a function of a processor 10 is as follows.

Step S31:

For example, let us consider a case where the processor 10-*b* being the IOP is switched to an EPU. In this case, the OS makes a processor 10 that is an EPU (e.g. processor 10-*c*) control the target processor 10-*b* and the I/O device 20-*b* which has been controlled by the target processor 10-*b*. By the instruction from the OS, the processor 10-*c* recognizes "switching of the processor 10-*b* to the EPU". Then, the processor 10-*c* executes the function switch module 120-5 of the EPU-FW code 120.

Step S32:

The function switch module 120-5 accesses the processor function information area 300 of the memory 30 and rewrites (changes) the function information 310-*b* stored in an area that is related to the target processor 10-*b*. More specifically, the function switch module 120-5 changes the assigned function information 311-*b* of the function information 310-*b* from the "IOP" to the "EPU" and also erases the concomitant information 312-*b*.

Step S33:

Also, based on the inter-processor communication, the function switch module 120-5 instructs the target processor 10-*b* to execute the initialization module 120-1 of the EPU-FW code 120. In response to the instruction, the processor 10-*b* executes the initialization module 120-1 of the EPU-FW code 120. Consequently, the processor 10-*b* is initialized to be the EPU and can operate as the EPU.

Step S34:

Let us consider a case where the I/O device 20-*b* which has been controlled by the target processor 10-*b* is continuously controlled by another processor 10-*d* to which the IOP is assigned. That is, the control of the I/O device 20-*b* is passed from the target processor 10-*b* to the processor 10-*d*. The processor 10-*d* has already controlled an I/O device 20-*d*. The instruction from the OS to the processor 10-*c* (EPU) also designates the processor 10-*d* that is an accepter of the I/O device 20-*b*.

In response to the instruction, the function switch module 120-5 accesses the processor function information area 300 of the memory 30 and changes (updates) the function information 310-*d* stored in an area that is related to the processor 10-*d*. More specifically, the function switch module 120-5 newly adds the I/O device 20-*b* to the concomitant information 312-*d* of the function information 310-*d*. Moreover, based on the inter-processor communication, the function switch module 120-5 reports the update of the concomitant information 312-*d* to the processor 10-*d*. In response to the report, the processor 10-*d* executes the concomitant information update module 130-3 of the IOP-FW code 130. The concomitant information update module 130-3 accesses the processor function information area 300 of the memory 30 and reads out the concomitant information 312-*d* (indicating I/O deices 20-*b* and 20-*d*) that is related to the processor 10-*d* itself. Then, the concomitant information update module 130-3 configures settings such that the processor 10-*d* can control the I/O device 20-*b* in addition to the I/O device 20-*d*.

In this manner, the function of the processor 10-*b* is switched from the IOP to the EPU. Moreover, the control of the I/O device 20-*b* is transferred from the processor 10-*b* to the processor 10-*d*.

Switching to other functions is possible as well in the similar manner. For example, it is also possible to switch the processor 10-*b* from the IOP to an encryption processor. In this case, the processor 10-*c* recognizes "switching of the processor 10-*b* to the encryption processor" by an instruction from the OS and executes the function switch module 120-5 (Step S31). The function switch module 120-5 accesses the processor function information area 300 of the memory 30 and changes the function information 310-*b* stored in the area that is related to the processor 10-*b* (Step S32). More specifically, the function switch module 120-5 changes the assigned function information 311-*b* of the function information 310-*b* from the "IOP" to the "encryption processor" and also erases the concomitant information 312-*b*.

Then, the function switch module 120-5 instructs the processor 10-*b* to execute the initialization module of the encryption processor-FW code 140, through the inter-processor communication. In response to the instruction, the processor 10-*b* executes the initialization module of the encryption processor-FW code 140 (Step S33). Consequently, the processor 10-*b* is initialized to be the encryption processor and can operate as the encryption processor. The transfer of the control of the I/O device 20-*b* is as explained above (Step S34). In this manner, the function of the processor 10-*b* is switched from the IOP to the encryption processor.

The OS or the application software can monitor operation rates of the EPU and IOP and freely switch the function of the processor 10 depending on the load status. In a case where it is detected that a significant difference in the operation rate between the EPU and the IOP occurs and the processing power of the entire information processing equipment 1 may be reduced, the OS or the application software can exert the function change means according to the exemplary embodiment in order to prevent the reduction of the processing power. For example, when the operation rates of all the EPUs are 100% and the operation rates of all the IOPs are 50% or below, the entire processing power of the information processing equipment 1 can be improved by switching some IOPs to additional EPUs. That is to say, it is possible to prevent drop in the performance of the entire information processing equipment 1 by balancing the loads on the processors 10.

Moreover, even in a case where a certain processor 10 becomes inoperative due to trouble, the processing power of the information processing equipment 1 can be maintained by transferring the function of the certain processor 10 to another processor 10. In particular, it is possible to prevent the halt of the operation of the entire information processing equipment 1, even in a case where an only one dedicated processor 10 providing a dedicated function fails. As explained in the foregoing section 3-1 (operation at the startup), the OS has obtained all the function information 310-0 to 310-*n* stored in the processor function information area 300 and has recognized which processor 10 has what function. It is therefore possible to perform the function switching in the same manner as described above, even if a certain processor 10 fails.

Furthermore, it is possible by using the function change means according to the exemplary embodiment to purposely suspend operations of some processors 10 in order to save the electric power consumption. In a case of light load, a processor 10 executing the light processing may be suspended for saving the electric power consumption. For example, an EPU clears the function information 310 related to the processor 10 and instructs the processor 10 to stop operating. As a result, the electric power consumption can be reduced.

3-4. FW Code Add/Change Operation

Figure 12:
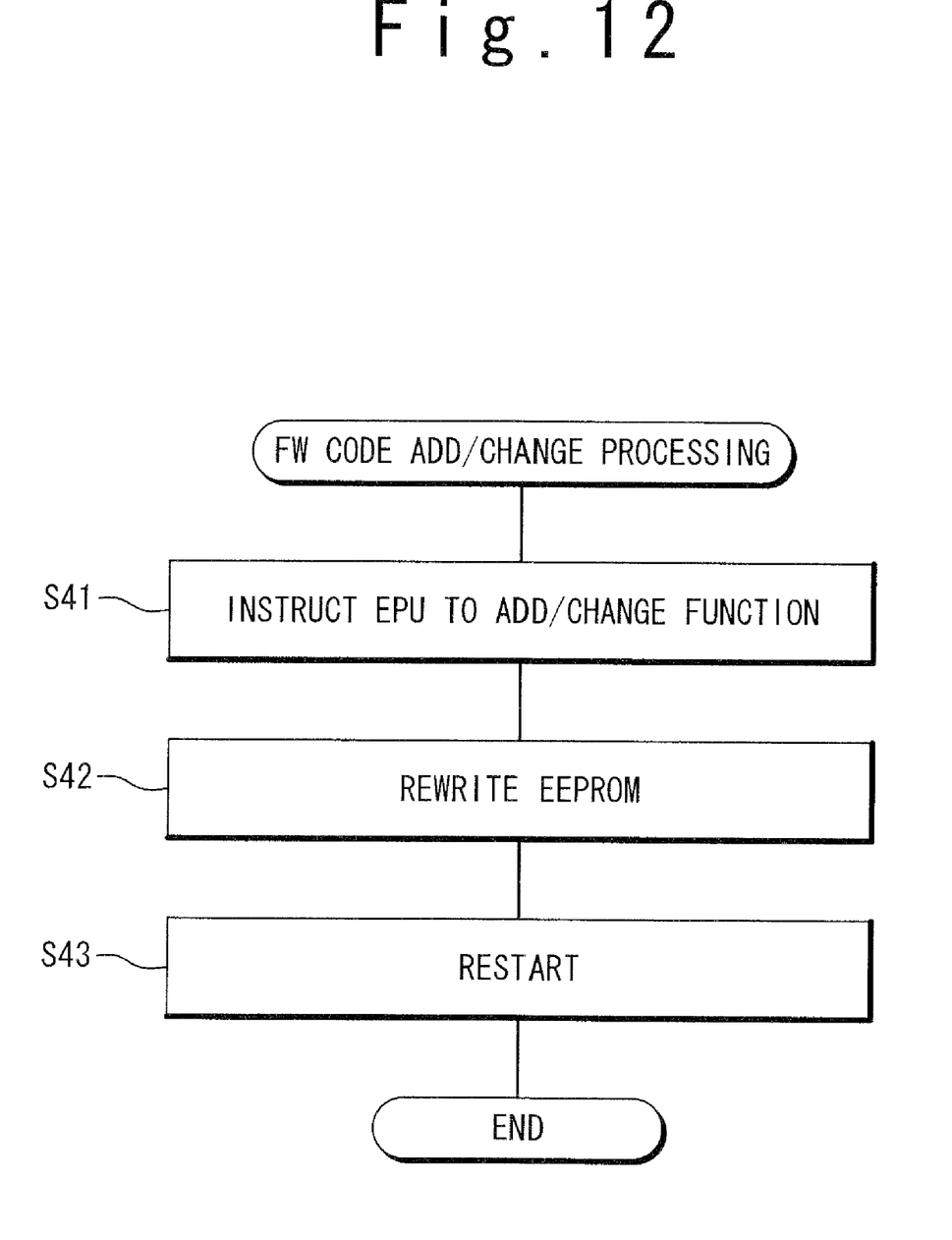
FIG. 12 is a flow chart showing an operation of adding/changing processor functions in the information processing equipment according to the exemplary embodiment.

It is also possible to add and/or change the kinds of the functions that the processors 10-0 to 10-*n* can provide. The addition and/or change of the processor functions can easily be achieved by changing (updating) the FW codes stored in the FW code area 600 of the EEPROM 40. FIG. 12 is a flow chart showing an operation of adding/changing the processor functions in the information processing equipment 1.

When the FW codes stored in the EEPROM 40 is to be changed, for example, an "FW-code change program" in the OS is executed during the operation of the information processing equipment 1. At this time, the OS specifies a FW code and instructs a processor 10 that is an EPU (e.g. processor 10-*c*) to execute the FW code change module 120-6 (Step S41). In response to the instruction, the processor 10-*c* executes the FW code change module 120-6 of the EPU-FW code 120. The FW code change module 120-6 stores the specified FW code in the FW code area 600 of the EEPROM 40 (Step S42). After that, the information processing equipment 1 is restarted (Step S43). As a result, each of the processors 10 can provide a new function of the newly-added FW code. In this manner, it is possible to easily add and/or change the functions of the information processing equipment 1.

4. Closing Statement

According to the exemplary embodiment, it is possible to switch a function of a processor to another function which the processor does not have in advance, for example. One reason is that a processor (e.g. general-purpose processor 10) executes an FW code stored in a memory area (e.g. memory 30). Another reason is that the processor refers to the function information indicating the function assigned to the processor and executes the FW code corresponding to the function information. Still another reason is that the function change means which can rewrite (change) the function information is provided.

For example, the plurality of function information 310-0 to 310-*n* specifying the respective functions provided by the plurality of general-purpose processors 10 are stored in the memory 30. Each general-purpose processor 10 refers to the corresponding one function information 310 and executes an FW code that provides a function specified by the corresponding one function information 310. In each of the general-purpose processors 10, the FW code corresponding to the function is executed. Consequently, even in a case where a general-purpose processor 10 does not originally have a dedicated processor function, it is possible to make the general-purpose processor 10 operate as a processor having the dedicated processor function like the dedicated processor.

In the exemplary embodiment, the EPU-FW code 120 includes the function switch module 120-5 for rewriting the contents of the function information 310. It is thus possible to change the contents of the function information 310 from a certain function to another function. That is to say, it is possible during the operation of the information processing equipment 1 to change an FW code executed by a processor 10 and freely switch the function of the processor 10. Since the loads on the processors can be dispersed depending on the load status, a drop in the performance of the entire information processing equipment 1 can be prevented. In other words, it is possible to equalize the loads on the processors 10 and hence optimize the processing power of the information processing equipment 1.

Moreover, even in a case where a certain processor 10 becomes inoperative due to trouble, the processing power of the information processing equipment 1 can be maintained by transferring the function of the certain processor 10 to another processor 10. In particular, it is possible to prevent the halt of the operation of the entire information processing equipment 1, even in a case where an only one dedicated processor 10 providing a dedicated function fails.

Also, for example, it is possible to change the FW codes stored in the FW code area 600 of the EEPROM 40 by the FW code change module 120-6 of the EPU-FW code 120. That is to say, it is possible to easily add and/or change the functions of the information processing equipment 1.

In the exemplary embodiment, the processor 10 can be a multi-core processor. In this case, each multi-core processor 10 may include at least one core serving as the EPU. The same can be applied to this case. That is, the EPU core can freely switch a function of another core in the similar manner.

The information processing equipment 1 to which the present invention is applied is exemplified by a general computer, a server, a magnetic disk device, a communication processing device and the like.

It will be obvious to one skilled in the art that the present invention may be practiced in other exemplary embodiments that depart from the above-described specific details. The scope of the present invention, therefore, should be determined by the following claims.

What is claimed is:

1. An information processing equipment comprising:
a plurality of processors;
a memory; and
a function change module,
wherein said memory comprises:
a code area in which a plurality of firmware codes are stored; and
a processor function information area in which a plurality of function information associated with said plurality of processors respectively are stored,
wherein each of said plurality of function information indicates a corresponding function assigned to the associated processor by referring to one of a firmware code of said plurality of firmware codes,
wherein each of said plurality of processors refers to said associated function information stored in said processor function information area to execute a firmware code, and
wherein said function change module rewrites function information associated with a specified processor among said plurality of processors by referring to a different firmware code of said plurality of firmware codes to change a function of said specified processor without rewriting said plurality of firmware codes.

2. The information processing equipment according to claim 1,
wherein a plurality of firmware codes including said firmware code and a plurality of function information including said function information are stored in said memory, and said plurality of function information indicate respective functions assigned to said plurality of processors,
wherein each of said plurality of processors refers to a corresponding function information of said plurality of function information and executes any of said plurality of firmware codes corresponding to said function information,
wherein said function change module rewrites at least any of said plurality of function information.

3. The information processing equipment according to claim 2,
wherein said plurality of firmware codes include:
an execution processing unit (EPU) firmware code providing an execution processor function; and
a first firmware code providing a first function,
wherein said plurality of processors include:
an execution processor executing said EPU firmware code; and
a first processor executing said first firmware code,
wherein said plurality of function information include a first function information indicating a function assigned to said first processor, wherein said EPU firmware code includes a function switch module as said function change module for changing contents of said first function information.

4. The information processing equipment according to claim 3,
wherein in an operation of switching a function of said first processor, said execution processor executes said function switch module in accordance with an instruction from an operating system (OS), and said function switch module changes contents of said first function information from said first function to another function.

5. The information processing equipment according to claim 4,
wherein said first function is a data input-output function, said first firmware code is an input/output processor (IOP) firmware code providing said data input-output function, and said another function is said execution processor function,
wherein when said first function information is changed, said first processor refers to said changed first function information and executes said EPU firmware code instead of said IOP firmware code.

6. The information processing equipment according to claim 5,
wherein each of said plurality of function information includes a concomitant information indicating information associated with said assigned function,
wherein before said operation of switching, said concomitant information in said first function information indicates an input-output device controlled by said first processor.

7. The information processing equipment according to claim 6,
wherein said plurality of processors further include a second processor executing said IOP firmware code, and said plurality of function information further include a second function information related to said second processor,
wherein in said operation of switching, said function switch module erases said concomitant information in said first function information and adds said input-output device to said concomitant information in said second function information.

8. The information processing equipment according to claim 7,
wherein said IOP firmware code includes a concomitant information update module,
wherein in said operation of switching, said function switch module reports update of said concomitant information in said second function information to said second processor,
wherein said second processor executes said concomitant information update module in response to said report, and said concomitant information update module refers to said concomitant information in said second function information and configures settings such that said second processor controls said input-output device.

9. The information processing equipment according to claim 4,
wherein said first function is a data input-output function, said first firmware code is an input/output processor (IOP) firmware code providing said data input-output function, and said another function is a dedicated function that does not execute codes of said OS,
wherein said plurality of firmware codes further include a dedicated function firmware code providing said dedicated function, wherein when said first function information is changed, said first processor refers to said changed first function information and executes said dedicated function firmware code instead of said IOP firmware code.

10. The information processing equipment according to claim 4,
wherein said first function is said execution processor function, said first firmware code is said EPU firmware code, and said another function is a data input-output function,
wherein said plurality of firmware codes further include an input/output processor (IOP) firmware code providing said data input-output function,
wherein when said first function information is changed, said first processor refers to said changed first function information and executes said IOP firmware code instead of said EPU firmware code.

11. The information processing equipment according to claim 3,
wherein said EPU firmware code further includes a processor function acquisition module,
wherein said execution processor executes said processor function acquisition module in accordance with an instruction from an operating system (OS), and said processor function acquisition module reads said plurality of function information from said memory and returns said read plurality of function information to said OS.

12. The information processing equipment according to claim 3 further comprising an electrically erasable programmable read-only memory (EEPROM) in which said plurality of firmware codes and said plurality of function information are stored,
wherein in a startup operation, said plurality of firmware codes and said plurality of function information stored in said EEPROM are copied to said memory.

13. The information processing equipment according to claim 12,
wherein said EPU firmware code further includes a code change module,
wherein said execution processor executes said code change module in accordance with an instruction from an operating system (OS), and said code change module changes or adds said plurality of firmware codes stored in said EEPROM.

14. A method of changing a processor function in an information processing equipment that includes a plurality of processors, a memory and a function change module, said memory comprises a code area in which a plurality of firmware codes are stored, said method comprising:
storing in a processor function information area a plurality of function information associated with said plurality of processors respectively, each of said plurality of function information indicates a corresponding function assigned to the associated processor by referring to one of a firmware code of said plurality of firmware codes;
executing a firmware code by each of said plurality of processors by to said associated function information stored in said processor function information area; and
rewriting said function information associated with a specified processor among said plurality of processors by referring to a different firmware code of said plurality of firmware codes to change a function of said specified processor without rewriting said plurality of firmware codes.

* * * * *